INVENTORS.
James E. Hawkins
& Beverly W. Koeppel

May 1, 1951  J. E. HAWKINS ET AL  2,551,211
RADIO POSITION INDICATING SYSTEM AND APPARATUS
Filed June 21, 1949  5 Sheets-Sheet 3
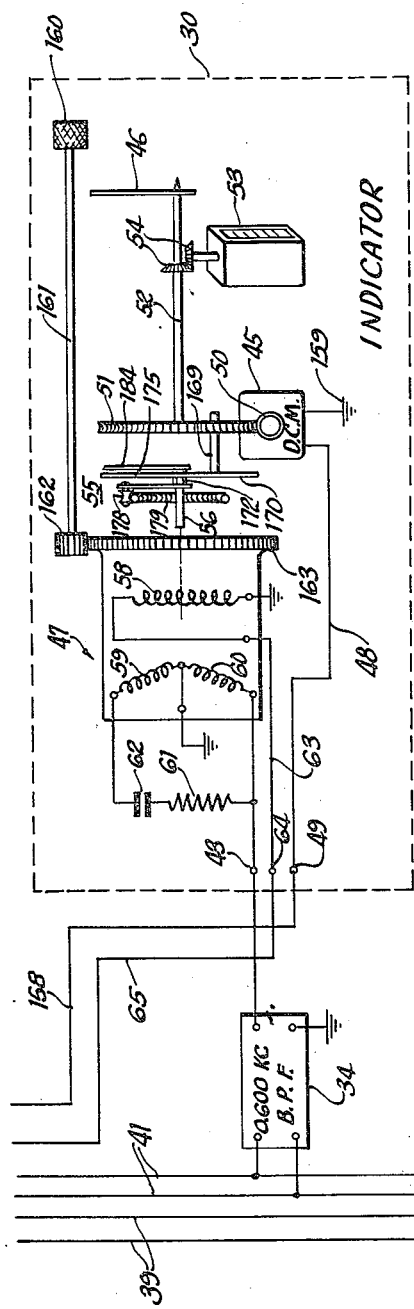
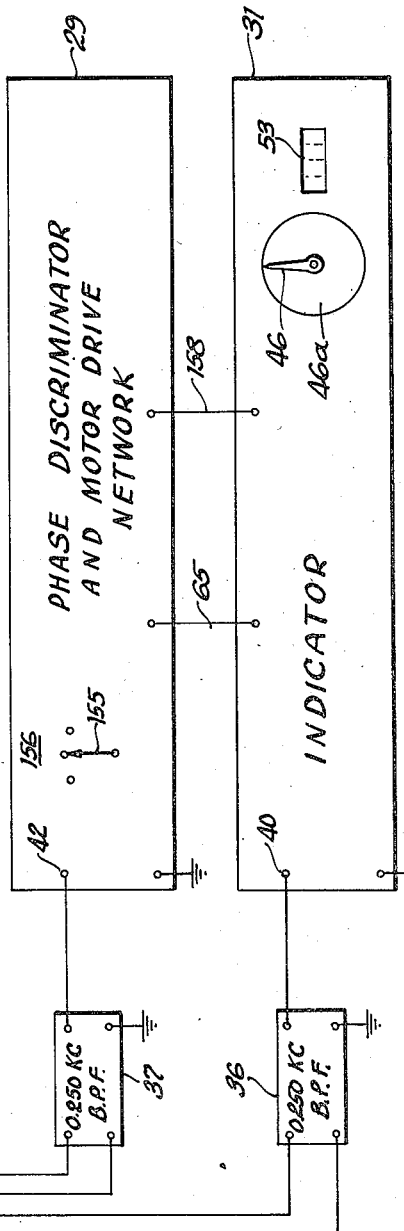
Fig.3
INVENTORS.
James E. Hawkins
& Beverly W. Koeppel
BY
Mason, Kolehmainen, Rathburn & Wyss
Attys

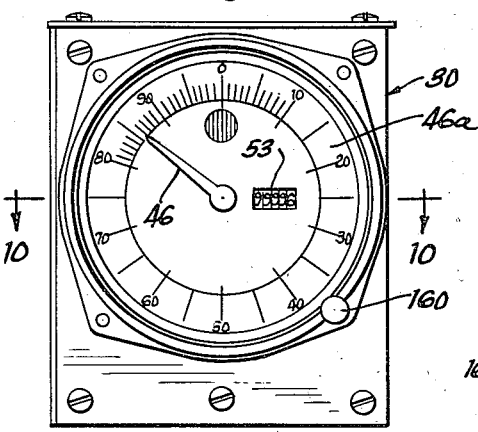
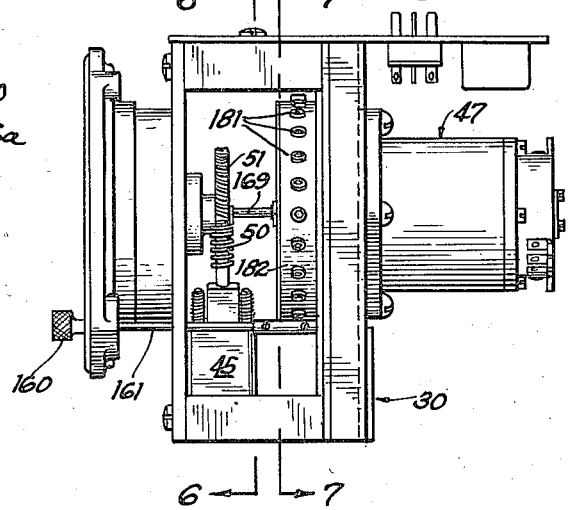
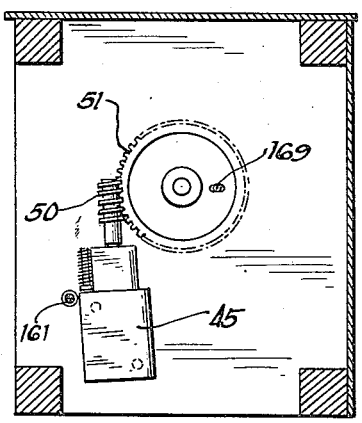
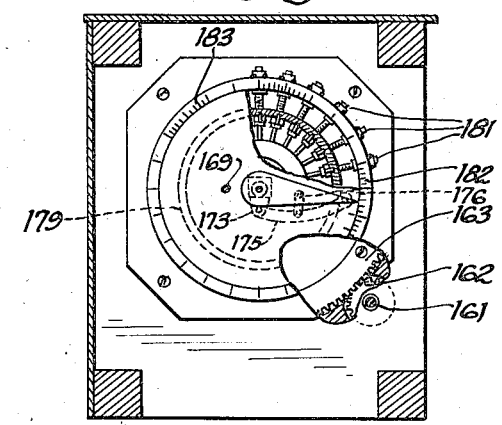
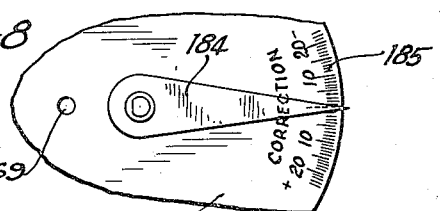
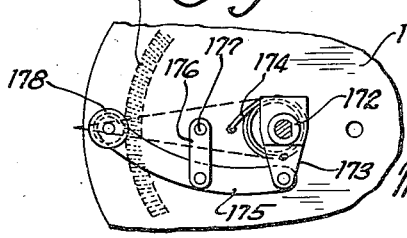

May 1, 1951  J. E. HAWKINS ET AL  2,551,211
RADIO POSITION INDICATING SYSTEM AND APPARATUS
Filed June 21, 1949  5 Sheets-Sheet 5

INVENTORS.
James E. Hawkins
& Beverly W. Koeppel
BY
Mason, Kolehmainen, Rathburn & Wyss
Att'ys Patented May 1, 1951

2,551,211

UNITED STATES PATENT OFFICE 2,551,211

RADIO POSITION INDICATING SYSTEM AND APPARATUS

James E. Hawkins and Beverly W. Koeppel, Tulsa, Okla., assignors to Seismograph Service Corporation, Tulsa, Okla., a corporation of Delaware Application June 21, 1949, Serial No. 100,382

15 Claims. (Cl. 343—105)

The present invention relates to receiving and translating apparatus for radio position finding systems and more particularly to improvements in receiving and translating apparatus including phase comparison and indicating means for use in radio position finding systems of the hyperbolic, continuous wave type employing phase comparison in pairs of position indication signals radiated from at least three spaced transmitting points to provide indications from which the position of a mobile receiving point relative to the known positions of the transmitting points may be determined.

In systems of the particular type referred to, the continuous waves radiated from each pair of transmitters produce standing waves in space, the phase relationship of which changes as a function of changing position between the two transmitting points. More specifically, the standing waves produced by each pair of transmitting units of the system are characterized by iso-phase lines which are hyperbolic in contour about the transmitting points as foci. On a line bisecting the pair of transmitters, these iso-phase lines are spaced apart a distance equal to one-half the mean wavelength of the radiated waves and have diverging spacings at points on either side of this line. With this system arrangement, the position of a receiving point relative to a pair of hyperbolic iso-phase lines may be determined by measuring the phase relationship between continuous waves radiated from the pair of transmitters. Since the point of location of the receiving point along the zone separating the two iso-phase lines is not indicated by such a phase measurement, it becomes necessary to employ at least three spaced transmitters, different pairs of which function to provide a grid-like pattern of intersecting hyperbolic lines, in order to obtain absolute determination of the position of the receiving point.

Systems of the character described are exceedingly accurate in so far as the position indications produced at the receiving point are concerned. To obtain the desired indication accuracy, however, it is necessary to maintain phase synchronization between the continuous waves radiated by the spaced transmitters, or alternatively, so to arrange the system that phase shifts between the radiated waves are compensated during the phase comparing operation. Phase synchronization of the waves radiated from the plurality of transmitters presents an exceedingly difficult problem which has been the subject of considerable development work. All solutions which have been found for this problem involve the use of relatively elaborate and somewhat delicate instrumentation not well adapted for the continuity of service required in position determining systems. To obviate this problem, systems of the continuous wave hyperbolic type have been proposed in which the phase shift problem is obviated by heterodyning the carrier waves of each pair of transmitters at a fixed link transmitting point, and modulating the difference frequency component of the heterodyned waves as a reference signal upon the carrier output of the link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of iso-phase lines.

While receiving and translating apparatus embodying the present invention is highly useful in systems of the type described and is likewise capable of more general application where phase comparison of continuous wave signals is desired, such receiving and translating apparatus is particularly applicable to radio position finding systems of the type described and broadly claimed in copending applications Serial No. 778,796 filed October 9, 1947, now Patent No. 2,513,317 issued July 4, 1950, in the name of James E. Hawkins and Robert S. Finn, and Serial No. 42,648 filed August 5, 1948, now Patent No. 2,513,318 issued July 4, 1950, in the name of James E. Hawkins and Beverly W. Koeppel, which applications are assigned to the same assignee as the present invention and as to the latter of which this application is a continuation-in-part.

In the systems disclosed in the said copending applications the number of frequency channels required is minimized by so arranging the system that two of the three transmitting units forming a complete system are alternatively employed to radiate the required position indicating and reference signals. More specifically, the two combination position indicating and reference signal transmitters function to radiate pure unmodulated carrier wave energy when operating as position indicating signal transmitters and to radiate the same carriers modulated with reference signals when operating as reference signal transmitters and the two receivers at the receiving station alternately receive the two types of signals to produce equal frequency signals for phase comparison. In order to minimize errors of position indications due to minor frequency changes and amplitude variations in the signals to be compared, means are provided in the receiving equipment disclosed in application Serial No. 42,648 for maintaining amplitude equality of the signals to be phase compared and for compensating for phase shifts introduced into the phase comparing circuit by changes in the frequency of the signals.

It is an object of the present invention to provide improved receiving and phase comparing apparatus which is uniquely adapted for use in a position determining system of the character described.

It is a further object of the invention to provide an extremely accurate phase comparison and indicating apparatus.

It is another object of the invention to provide a null type phase comparison system for continuously and accurately indicating the relative phase difference between a pair of equal frequency signals.

It is still another object of the present invention to provide improved phase comparison systems capable of indication over more than a 360° range and including means for readily effecting zero setting of the system.

According to a still further object of the invention, an improved phase comparison system is provided which is relatively insensitive to changes in the relative amplitudes of the two input signals and has substantially the same degree of sensitivity to phase changes between the two input signals in all zones of a 360° indicating range.

The invention, both as to its organization and method of operation, together with further objects and advantages thereof, will best be understood by reference to the specification taken in connection with the accompanying drawings, in which:

Figs. 1, 2 and 3 when arranged vertically in order with the long dimension of each sheet disposed horizontally diagrammatically illustrate an improved radio position determining system including receiving and translating or phase comparing apparatus characterized by the features of the present invention;

Fig. 4 is a front elevational view of a physical embodiment of one of the indicators shown diagrammatically in Fig. 3;

Fig. 5 is a side elevational view of the indicator shown in Fig. 4;

Figure 10:
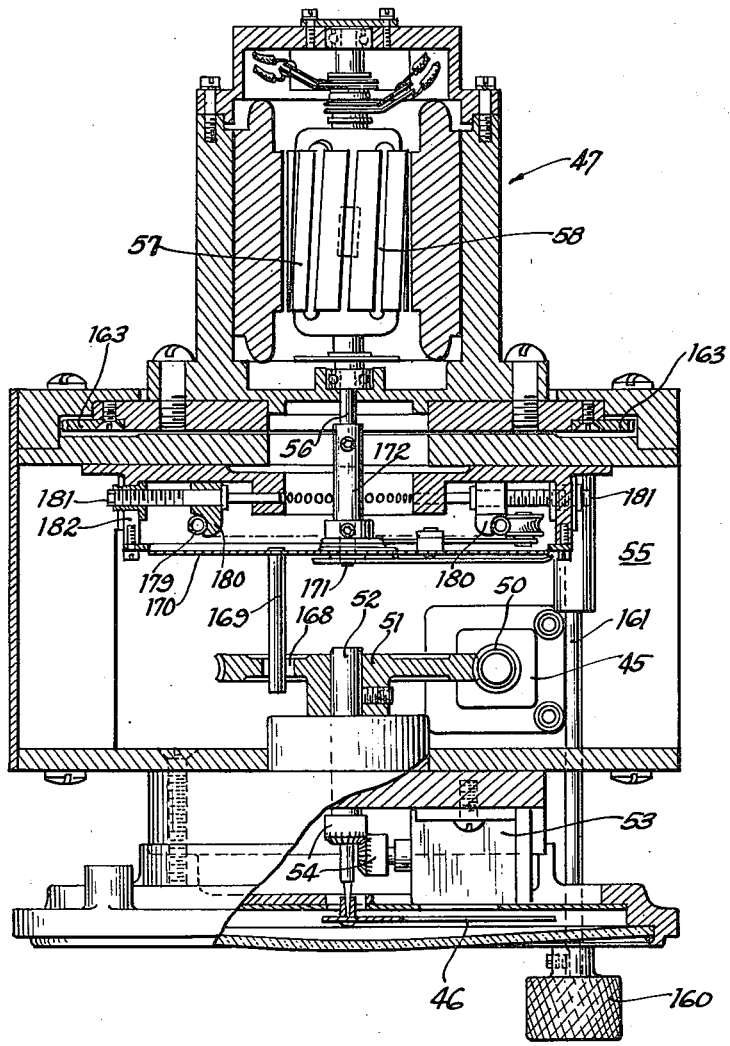

Figs. 6 and 7 are sectional elevational views taken respectively along the lines 6—6 and 7—7 of Fig. 5;

Figs. 8 and 9 are fragmentary detail elevational views on a somewhat enlarged scale respectively taken from the front and rear of a portion of the mechanism shown in Figs. 4 to 7, inclusive; and Fig. 10 is a sectional view on a somewhat enlarged scale taken substantially along the line 10—10 of Fig. 4.

Figure 1:
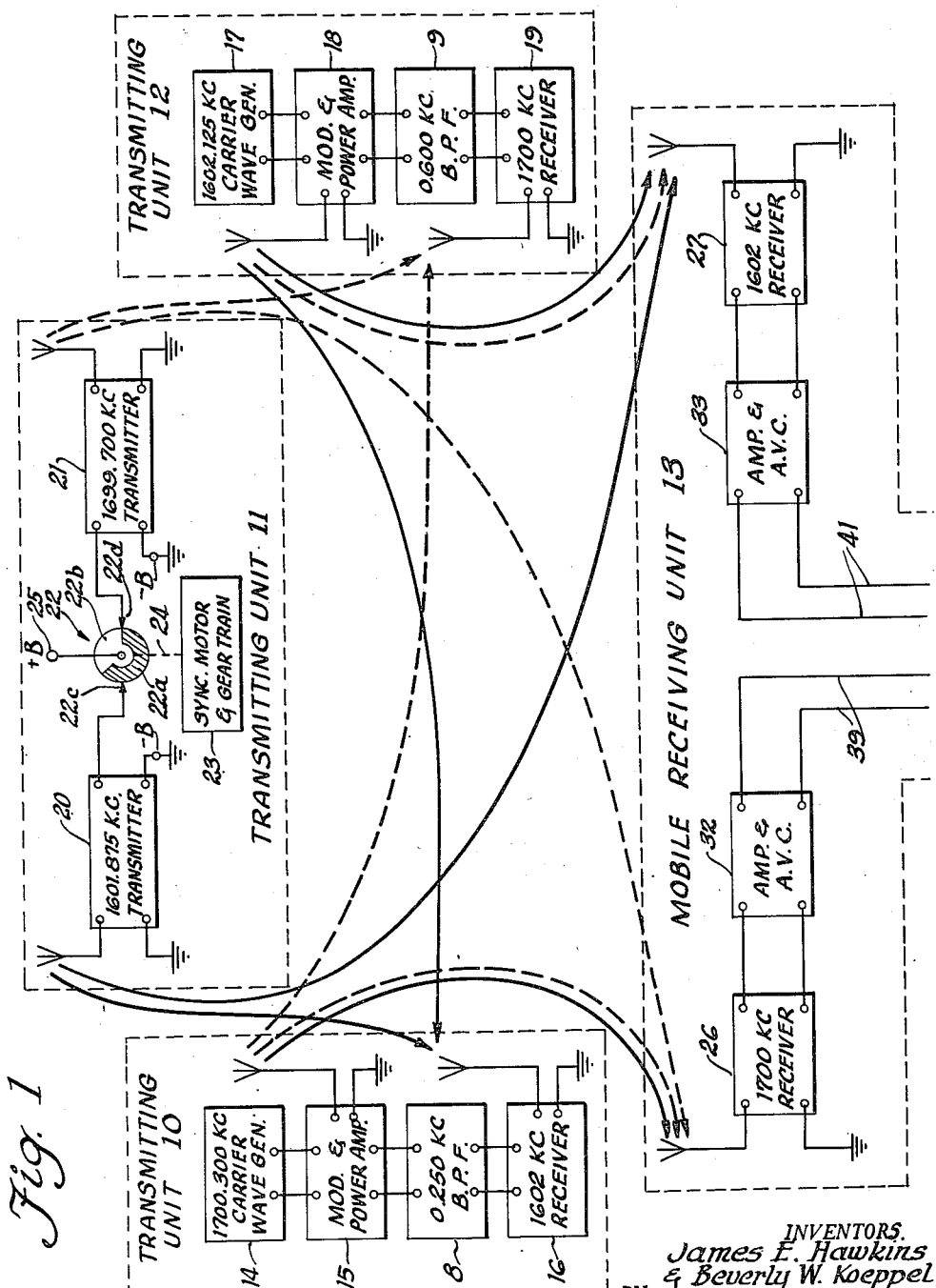
Figure 2:
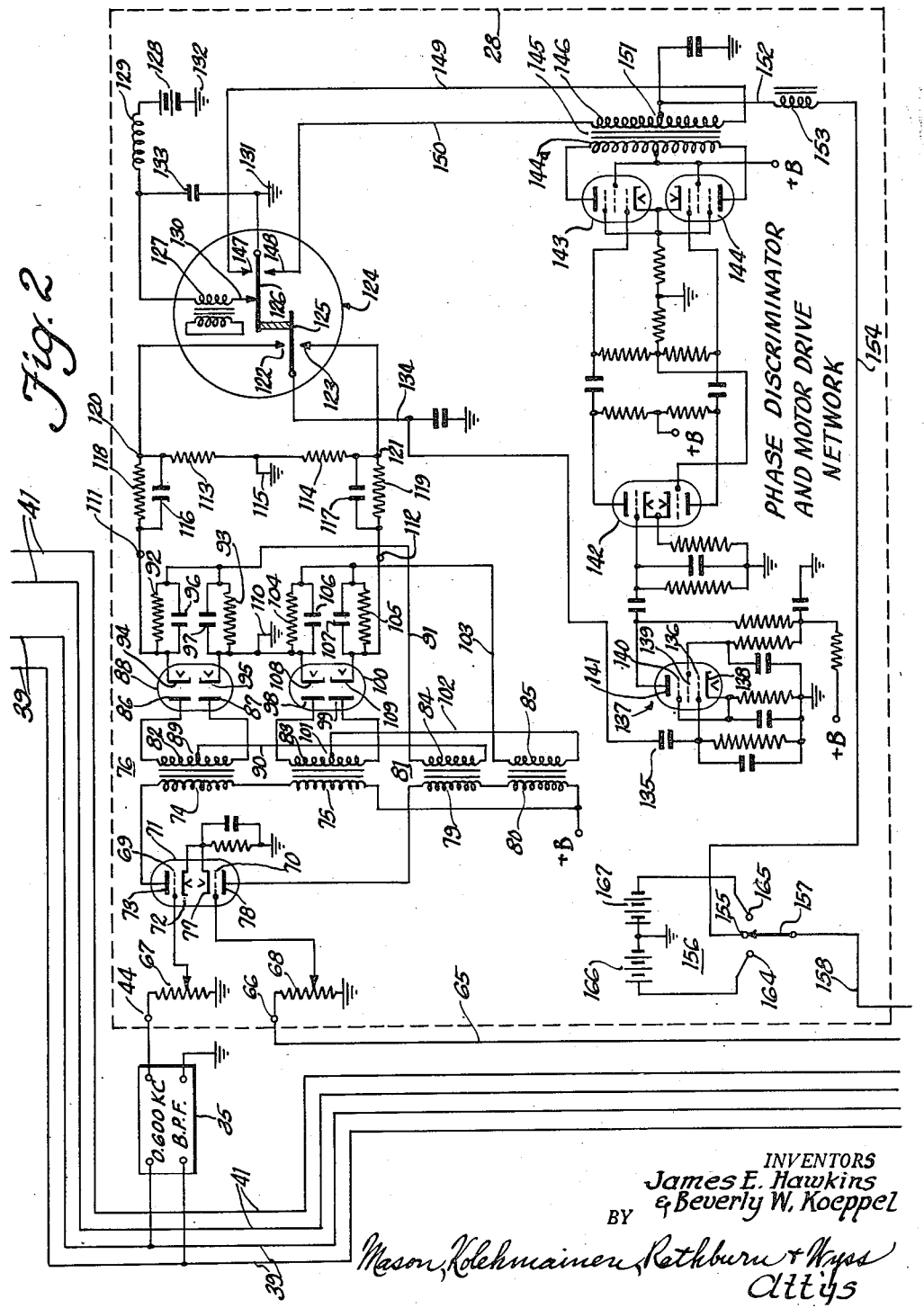

Referring now to the drawings and more particularly to Figs. 1, 2 and 3, the present invention is illustrated as embodied in a system for providing position information at a mobile receiving unit 13 which may be carried by a vessel or vehicle operating within the radius of transmission of three spaced transmitting units 10, 11, and 12. These units are preferably spaced apart approximately equal distances and are so positioned that the line bisecting the points of location of the units 10 and 11 is angularly related to the line bisecting the points of location of the units 11 and 12. As described more fully below, the transmitting units 10 and 12 are equipped continuously to radiate position indicating signals in the form of carrier waves of different frequencies, whereas the transmitting unit 11 is equipped alternately to radiate two additional position indicating signals in the form of carrier waves of still different frequencies. Specifically, the transmitter embodied in the unit 10 comprises a carrier wave generator or oscillator 14 and a modulator and power amplifier unit 15. Similarly, the transmitter embodied in the transmitting unit 12 comprises a carrier wave oscillator or generator 17 and a modulator and power amplifier unit 18. The transmitting unit 11 comprises two transmitters 20 and 21 for respectively radiating position indicating carrier waves at two different carrier frequencies, together with switching means for alternately rendering these two transmitters operative. In order to illustrate the action which occurs, arrow pointed solid lines have been shown in Fig. 1 of the drawing to indicate the receiving points of signal acceptance and the sources of the accepted signals during each period when the transmitter 20 is operating, and arrow pointed dashed lines have been shown to illustrate the receiving points of signal acceptance and the sources of accepted signals during each period when the transmitter 21 is operating. From a consideration of these lines and the following explanation, it will be understood that the receivers 26 and 27 (to be more fully described hereinafter) alternately function as reference signal detecting receivers and as heterodyning receivers for developing the required heterodyne or difference frequency signals. In the arrangement illustrated, keying of the two transmitters 20 and 21 for alternate operation is accomplished by alternately feeding anode current to the electron discharge tubes of the respective transmitters from the positive terminal 25 of the anode current source, not shown, through a commutating ring 22 which is shaft connected by means of a shaft 24 to be driven at a constant speed by a synchronous motor and gear train unit 23. More specifically, the positive terminal 25 of the anode current source is connected to the conductive segment 22b of the commutating ring 22, which segment spans slightly less than half the circumference of the ring. The remainder of the ring is comprised of an insulating segment 22a. At diametrically opposed points around the circumference of the ring, brushes 22c and 22d are provided which engage the ring periphery. These brushes are respectively connected to the positive bus conductors of the two transmitters 20 and 21, such that anode current is alternately delivered to the electron discharge tubes of the two transmitters. Since the conductive segment 22b of the ring 22 represents slightly less than half the peripheral surface of the ring, it will be understood that a short off-signal period is provided between successive periods during which the transmitters 20 and 21 are alternatively operated, thus preventing simultaneous radiation of waves by both transmitters. The periodicity with which the two transmitters 20 and 21 are alternately operated is, of course, dependent upon the speed of rotation of the commutating ring 22. Preferably, this ring is driven at a speed of one revolution per second such that the transmitters 20 and 21 are each rendered operative at one-half second intervals.

As indicated above, the carrier frequencies at which the four transmitters of the three transmitting units 10, 11 and 12 operate are all different. Preferably, however, these carrier waves are so paired that the frequencies of each pair are well within a single channel allocation of 10 kilocycles as specified by the Federal Communications Commission of the United States Government. To this end, the output frequency of the transmitter 20 and the output frequency of the transmitter in the unit 12, forming the first transmitter pair, may be 1601.875 and 1602.125 kilocycles respectively, such that the difference frequency therebetween is 0.250 kilocycle, while the output frequencies of the transmitter 21 and the transmitter of the unit 10, forming the second transmitter pair, may be 1699.700 and 1700.300 kilocycles, respectively, such that the difference frequency therebetween is 0.600 kilocycle. It will be noted that the channels in which the two pairs of carrier frequencies fall are separated in the frequency spectrum by approximately 100 kilocycles, thus facilitating selective reception of these carrier pairs in the manner more fully explained below. The power of the four transmitters is such that the entire area in which position information may be desired abroad the vehicle or vessel carrying the receiving unit 13 is blanketed with waves radiated from each of the four transmitters and that these waves have a field strength at all points within this area sufficient to permit reliable reception without requiring undue sensitivity of the receiving equipment.

In order to obviate the above mentioned difficulties attendant with phase synchronization of the position indication carrier waves radiated by the four transmitters, while at the same time eliminating the necessity for utilizing additional frequency channels, means are provided in the transmitting units 10 and 12 for alternately modulating the waves radiated by the transmitters of the units 10 and 12 with reference signals representative of the difference frequencies between the carrier wave pairs. These reference signals may be received at any receiving point, such, for example, as at the mobile receiving unit 13, located within the radius of transmission of the four transmitters. The equipment for this purpose as provided at the transmitting unit 10 comprises a fixed tuned amplitude modulation receiver 16, center tuned to a frequency of 1602 kilocycles and sharply selective to the 1601.875 and 1602.125 kilocycle carrier waves respectively radiated by the transmitter 20 and the transmitter of the unit 12. The selectivity of this receiver is obviously such that the carrier waves radiated by the transmitter 21 and the transmitter of the unit 10 are rejected in the radio frequency section thereof. The beat frequency of 0.250 kilocycle between the two carriers accepted by the radio frequency section of the receiver 16 is reproduced in the audio frequency section of this receiver and delivered to the modulator 15, for amplitude modulation upon the carrier output of the transmitter embodied in the unit 10, through a narrow band pass filter 8, which is center tuned to a frequency of 0.250 kilocycle. Similarly, the transmitting unit 12 is equipped with a fixed tuned amplitude modulation receiver 19 which is tuned to a carrier frequency of 1700 kilocycles and is sharply selective to the 1699.700 and 1700.300 kilocycle waves respectively radiated by the transmitter 21 and the transmitter of the unit 10. Here again, the selectivity of the receiver 19 is obviously such that the carrier waves radiated by the transmitter 20 and the transmitter of the unit 12 are rejected in the radio frequency section of the receiver. The beat frequency of 0.600 kilocycle between the two carrier waves accepted by the receiver 19 is reproduced in the audio frequency section thereof and modulated upon the carrier wave output of the transmitter embodied in the transmitting unit 12 through a narrow band pass filter 9 which is center tuned to a frequency of 0.600 kilocycle.

Referring now particularly to the receiving and translating equipment making up the mobile receiving unit 13 and the phase comparison apparatus associated therewith, it is pointed out that this equipment comprises a pair of fixed tuned amplitude modulation receivers 26 and 27, the output circuits of which are connected to the phase discriminators 28 (Fig. 2) and 29 (Fig. 3) and the indicators 30 and 31 (Fig. 3) through suitable amplifier and automatic gain or volume control stages 32 and 33 and through suitable narrow band pass filters 34, 35, 36 and 37, the band pass filters 34 and 35 being center tuned to a frequency of 0.600 kilocycle and the filters 36 and 37 being center tuned to a frequency of 0.250 kilocycle. More specifically, the receiver 26 is fixed tuned to a carrier frequency of 1700 kilocycles and is designed to accept the carrier wave radiated by the transmitter 21 and the carrier wave radiated by the transmitter of the unit 10 both when modulated and unmodulated. Similarly, the receiver 27 is fixed tuned to a carrier frequency of 1602 kilocycles and is designed to accept the carrier wave radiated by the transmitter 20 and the carrier wave radiated by the transmitter of the unit 12 both when modulated and unmodulated.

The automatic gain control or AVC circuits associated with the amplifier stages 32 and 33 are of the variable impedance type known in the art and capable of functioning without introducing amplitude distortion or variable phase shift in the reference signals and the heterodyne or difference frequency signals developed at the output terminals of the receivers. Preferably the amplifier and AVC stages are of the type disclosed in a copending application of James E. Hawkins and Jesse R. Cornett, Serial No. 673,744 filed June 1, 1946, for Seismic Signal Amplifier and assigned to the same assignee as the present invention and each of these stages corresponds to the automatic gain control and amplifier stage identified by the reference number 13 in the said Hawkins and Cornett application.

The filters 35 and 36, 34 and 37, which may be of any standard commercial construction, perform the function of selecting the heterodyne or difference frequency signals alternately developed at the output terminals of the receivers 26 and 27, respectively, and amplified in the stages 32 and 33, and delivering these signals to the phase discriminators and indicators as hereinafter described.

In considering the operation of the above-described position determining system, it will be understood that when the motor and gear train unit 23 is operating to drive the commutating ring 22, anode current is alternately delivered to the electron discharge tubes of the transmitters 20 and 21, such that these transmitters are alternately rendered operative to radiate carrier waves at frequencies of 1601.875 and 1699.700 kilocycles, respectively. The transmitters of the units 10 and 12, on the other hand, operate continuously. Accordingly, during each interval when the transmitter 20 is in operation, the carrier waves of 1601.875 and 1602.125 kilocycles respectively radiated by the transmitter 20 and the transmitter of the unit 12 are picked up and heterodyned in the radio frequency sections of the receivers 16 and 27. In the receiver 16, the difference frequency signal of 0.250 kilocycles is reproduced in the audio section of the receiver, passed by the filter 8 and modulated upon the carrier wave output of the transmitter in the unit 10 for radiation as a reference signal. If desired an amplifier and automatic gain control stage similar to the stages 32 and 33 may be interposed in the output circuit of the receiver 16 in order to maintain constant modulation. This modulated carrier wave is received by the receiver 26 of the mobile receiving unit 13 and the 0.250 kilocycle modulation component is reproduced at the output terminals of this receiver. During the period indicated, the transmitter 21 is not in operation and hence no heterodyne or beat frequency signal is developed by the receiver 26. The 0.250 kilocycle reference signal as thus reproduced by the receiver 26 is amplified to the proper level in the amplifier and AVC stage 32 and applied by way of the conductors 39 to the input terminals of the band pass filters 35 and 36. The 0.600 kilocycle filter 35 rejects the applied signal and thus prevents the same from being applied to the phase discriminator 28, but the filter 36 passes the signal to the input terminal 40 of the phase indicator 31.

The 0.250 kilocycle beat frequency or heterodyne signal resulting from heterodyning of the carriers radiated by the transmitter 20 and the transmitter of the unit 12 in the radio frequency section of the receiver 27 is reproduced across the output terminals of this receiver and after amplification to the proper level in the amplifier and AVC stage 33 is applied through the conductors 41 to the input terminals of the band pass filters 34 and 37 in parallel. The 0.600 kilocycle filter 34 prevents the 0.250 kilocycle signal from being applied to the indicator 30 but the filter 37 passes the 0.250 kilocycle signal developed across the output terminals of the receiver 27 and applies the same to the upper input terminal 42 of the phase discriminator 29. Thus two signal voltages of identical frequency are applied to the input terminals 42 and 40 of the associated phase discriminator and phase indicator 29 and 31, which function as hereinafter explained to measure the phase angle therebetween. The phase angle indication thus obtained is accurately representative of the position of the receiving unit 13 between two isophase lines of the standing waves produced in space as a result of the carrier wave radiation by the transmitter 20 and the transmitter of the unit 12.

At the end of the described transmitting interval, the commutating ring 22 functions to interrupt the circuit for delivering anode current to the tubes of the transmitter 20, with the result that carrier wave radiation from this transmitter is terminated. When radiation of this wave stops, the carrier heterodyning action of the two receivers 16 and 27 is likewise terminated to interrupt the reference signal radiation by the transmitter of the unit 10 and to interrupt the heterodyne or difference frequency signal being developed across the output terminals of the receiver 27. Thus the phase discriminator 29 and the indicator 31 are rendered ineffective further to change the setting of the indicating element of the indicator 31.

A short time interval after operation of the transmitter 20 is stopped, the commutating ring 22 functions to deliver anode current to the tubes of the transmitter 21 and thus initiate operation of this transmitter. With the transmitter 21 in operation, a 1699.700 kilocycle position indicating carrier wave is radiated thereby which is accepted by the receivers 19 and 26. More specifically, the receiver 19 functions to heterodyne the carrier wave radiated by the transmitter 21 with the carrier wave radiated by the transmitter of the unit 10 and to reproduce the heterodyne or difference frequency signal of 0.600 kilocycle in the audio frequency section thereof. This difference frequency or reference signal is passed by the filter 9, modulated upon the output carrier wave of the generator 17 in the modulator and power amplifier unit 18 and radiated as a modulation component upon the carrier wave transmitted by the transmitter of the unit 12 to the receiver 27. As previously mentioned in connection with the receiver 16 of unit 10, a suitable amplifier and automatic gain control stage may be interposed in the output circuit of the receiver 19 in order to maintain constant modulation. The receiver 27 accepts the modulated carrier wave and reproduces the modulation component thereof in the usual manner. The reference signal thus developed across the output terminals of the receiver 27 is amplified to the proper level in the amplifier and AVC stage 33 and applied through the conductors 41 to the input terminals of the band pass filters 34 and 37 in parallel. The filter 37 functions to reject the applied reference signal voltage and thus prevents the same from being impressed upon terminal 42 of the phase discriminator 29, but the filter 34 passes the 0.600 kilocycle reference signal to the upper input terminal 43 of the indicator 30. It will be understood that the receiver 27 is incapable of accepting the carrier wave radiated by the transmitter of the unit 10. Hence this receiver is prevented from heterodying the carrier wave radiated by the transmitter of the unit 10 with the carrier wave radiated by the transmitter of the unit 12.

The 1699.700 and 1700.300 kilocycle waves respectively radiated by the transmitter 21 and the transmitter of the unit 10 are both accepted by the receiver 26 and heterodyned in the radio frequency section thereof to produce a heterodyne or difference frequency signal which is produced across the output terminals of the receiver and after amplification to the proper level in the amplifier and AVC stage 32 is applied through the conductors 39 to the input terminals of the filters 35 and 36 in parallel. The filter 36 rejects the signal voltage, thus preventing its application to the terminal 40 of the indicator 31, but the 0.600 kilocycle reference signal is passed by the filter 35 and applied to the input terminal 44 of the phase discriminator 28. Thus reference and heterodyne or difference frequency signals of identical frequencies are respectively applied to the input terminals 44 and 43 of the associated phase discriminator and phase indicator 28 and 30, which function as hereinafter explained to measure the phase relationship between the two applied signal voltages and thus provide an indication accurately representative of the position of the receiving unit 13 between two iso-phase lines of the standing waves produced in space by the radiation of position indicating carrier waves from the transmitter 21 and the transmitter at the unit 10.

At the end of the described transmitting interval, the commutating ring 22 functions to interrupt anode current flow to the tubes of the transmitter 21 and thus arrest operation of this transmitter. When carrier wave radiation by the transmitter 21 is thus terminated, the wave heterodying action effected in the receivers 19 and 26 is instantly stopped to terminate the radiation of the 0.600 kilocycle reference signal by the transmitter of the unit 12 and to terminate reproduction of the difference or heterodyne signal at the output terminals of the receiver 26. Thus the application of signal voltages to the input terminals of the phase discriminator and indicator 28 and 30 is interrupted, with the result that no further change in the setting of the indicating element of the indicator 30 can be produced. A short time interval after operation of the transmitter 21 is arrested, the commutating ring 22 functions to recomplete the circuit for delivering anode current to the tubes of the transmitter 20 and thus reinitiate operation of this transmitter with the results described above.

From the foregoing explanation, it will be understood that the transmitters 20 and 21 in their alternate operation to radiate position indicating carrier waves, cooperate with the receivers 16 and 19 of the transmitting units 10 and 12 alternately to render the transmitters of these units operative to radiate position indicating signals and reference signals. More in particular, the position indicating carrier waves alternately radiated by the transmitters 20 and 21 alternately cause the position indicating carrier waves respectively radiated by the transmitters of the units 10 and 12 to be modulated with reference signals during periods when these transmitters are respectively inactive as position indicating signal radiators. Specifically, the receiver 26 functions as a heterodyne receiver in respect to the position indicating carrier waves radiated by the transmitter 21 and the transmitter of the unit 10, and functions as a reference signal reproducing receiver in receiving the reference signal modulated carrier radiated by the transmitter of the unit 10. The receiver 27 on the other hand, functions as a heterodyne receiver in respect to the position indicating carrier waves radiated by the transmitter 20 and the transmitter of the unit 12 and as a reference signal detecting receiver in receiving the reference signal modulated carrier wave radiated by the transmitter of the unit 12.

As will be evident from the above explanation, the associated phase discriminator and indicator 29 and 31 function as hereinafter described to produce a phase angle indication which is representative of the position of the receiving unit 13 between two iso-phase lines of the standing waves produced in space as a result of carrier wave radiation by the transmitter 20 and the transmitter of the unit 12. With the described arrangement, wherein carrier wave frequencies of 1601.875 and 1602.125 kilocycles are employed, the wavelength spacing between the iso-phase lines along a line bisecting the units 11 and 12 is determined by the mean frequency of 1602 kilocycles between the two radiated carrier waves. At this particular mean frequncy, iso-phase lines representative of the same phase relationship between the standing waves produced by the transmitter 20 and the transmitter of the unit 12 along the line joining the unit 20 and the unit 12 are spaced apart a distance of about 307 feet. Hence the indication provided by the indicator 31 identifies the position of the receiving unit 13 within a zone not less than 307 feet in width, i. e., a zone having a minimum width equal to one half the wavelength of a wave having a frequency equal to the mean frequency of the position indicating carrier waves radiated by the transmitter 20 and the transmitter of the unit 12.

As previously indicated, the indication provided by the indicator 31, standing alone, is ambiguous for the reason that this indication does not identify the point of location of the receiving unit 13 along the zone separating the two adjacent iso-phase lines of the lines of the standing waves produced in space by the transmitter 20 and the transmitter of the unit 12. Identification of this point is obtained through the response of the receiving unit to the position indicating signals radiated by the transmitter 21 and the transmitter of the unit 10. Thus, the phase discriminator and indicator 28 and 30 provide an indication of the position of the receiving point, namely, the unit 13, between two iso-phase lines of the standing waves produced in space by the radiation of position indicating carrier waves from the transmitter 21 and the transmitter of the unit 10. Here again, the wavelength spacing of iso-phase lines along a line bisecting the two units 10 and 11 is determined by the mean frequency of 1700 kilocycles between the frequencies of the waves radiated by the transmitter 21 and the transmitter of the unit 10. At this particular mean frequency, iso-phase lines representative of the same phase relationship between the standing waves produced by the two identified transmitters have a minimum spacing of approximately 289 feet, such that the indication provided by the indicator 30 identifies the position of the receiving unit 13 within a zone having a 289 foot minimum width. The two indications thus provided by the phase indicators 30 and 31 may readily be resolved into distance indications from which the position of the receiving point relative to the two transmitting units 10 and 12 may be determined. With these distances known and the positions of the transmitting units 10 and 12 known, the position of the receiving point may obviously be easily determined.

Since the phase discriminators 28 and 29 are identical in construction and operation, except for the frequencies to which they respond, and since the same is true of the phase indicators 30 and 31, only the phase discriminator 28 and the phase indicator 30 have been illustrated in detail. The phase discriminator 28 which, as indicated in Fig. 2, includes a motor drive network to be hereinafter described, and the indicator 30 which includes a direct current motor 45 for driving an indicating element or pointer 46 and the rotor of a variable phaser or control transformer 47, function together to provide a follow-up type phase difference measuring and indicating system, the operation of which will be described, during an interval in which a 0.600 kilocycle position indicating heterodyne signal is being applied from the receiver 26 to the terminal 44 of the phase discriminator 28 and a 0.600 kilocycle reference signal is being applied from the receiver 27 to the terminal 43 of the indicator 30.

The motor 45, which is preferably of the type having a permanent magnet field, has one terminal of its armature winding connected to ground, as shown, and its other terminal is connected by a conductor 48 to an input terminal 49 of the indicator 30, to which terminal is applied a direct current voltage derived from the phase discriminator 28, through the motor drive network thereof. As shown in Fig. 3, the direct current motor 45 is connected to the indicator member or pointer 46 through reduction gearing comprising a worm 50 and a worm gear 51 carried by the shaft 52 on which the pointer 46 is mounted. The pointer 46 is movable through more than 360 degrees with respect to a suitably calibrated scale 46a (Fig. 4) and a suitable revolution counter 53 is connected to the shaft 52 through bevel gears 54.

The motor 45 is likewise connected through the worm 50 and the worm gear 51 and through a suitable coupling mechanism 55 which will be more fully described hereinafter, to a shaft 56 on which is carried the rotor 57 (Fig. 10) of a variable phaser or control transformer 47. The control transformer, as shown in Fig. 3, is provided with a rotor winding 58 and a pair of stator windings 59 and 60. The stator windings 59 and 60 are arranged mechanically 90 degrees apart and are connected to the input terminal 43 so as to be electrically 90 degrees apart, the connection to the winding 59 including a resistor 61 and a condenser 62 for providing the desired phase shift. With the control transformer 47 thus connected, it will be apparent that when the stator windings are energized with the 0.600 kilocycle reference signal supplied to the input terminal 43 through the band pass filter 34, a voltage will be induced in the rotor winding 58, which will be of constant amplitude but which will have a phase relation dependent upon the relative position of the rotor winding 58 with respect to the stator windings 59 and 60. Thus rotation of the rotor winding 58 will produce a variable phase voltage and, as shown, the rotor winding is connected by means of a conductor 63 to an output terminal 64 of the phase indicator 30, which output terminal is connected by a conductor 65 to an input terminal 66 of the phase discriminator 28.

Thus it will be seen that the input terminals 44 and 66 of the phase discriminator 28 are supplied with 0.600 kilocycle signals having a phase difference which is a function not only of the position of the mobile receiving unit 13 but also of the position of the rotor winding 58 of the variable phaser, and therefore the position of the indicating element or pointer 46. As will be more fully explained hereinafter, the phase discriminator and the motor drive network function to produce a direct current voltage, the amplitude and polarity of which are a function of the relative phase between the signals supplied to the terminals 44 and 66 and this direct current voltage is applied to the motor 45 of the indicator 30 so as to rotate the indicator 46 and at the same time rotate the rotor of the control transformer 47 in a direction to bring the phase of the signal produced in the rotor winding into a phase relationship with respect to the position indicating signal applied to the input terminal 44 of the phase discriminator 28 such that the driving voltage applied to the motor 45 will become zero. Consequently, the pointer 46 will at all times indicate the relative position of the mobile receiving unit 13 relative to a pair of iso-phase lines as hereinbefore explained, while the revolution counter will indicate the number of iso-phase lines that have been crossed by the mobile receiving unit relative to the starting point.

Referring now particularly to the discriminator network as shown in Fig. 2, the two input signals are applied from the input terminals 44 and 66 through suitable adjustable potentiometers 67 and 68 to the upper and lower control grids 69 and 70 of a multi-section triode connected amplifier tube 71. The upper section of the amplifier tube includes a cathode 72 and an anode or plate 73 which, as shown, are connected in an output circuit which includes a pair of series connected primary windings 74 and 75 of a suitable transformer 76. Likewise the lower section of the amplifier tube 71 includes a cathode 77 and an anode or plate 78 which are connected in a similar output circuit which includes a pair of series connected primary windings 79 and 80 of a transformer 81. The transformer 76 includes a pair of center tapped secondary windings 82 and 83 respectively associated with the primary windings 74 and 75, while the tarnsformer 81 includes a pair of secondary windings 84 and 85 respectively associated with the primary windings 79 and 80 and adapted to produce secondary voltages approximately equal in magnitude to the voltages produced across half of each of the secondary windings 82 and 83.

As shown, the outer terminals of the secondary winding 82 are respectively connected to the upper and lower plates 86 and 87 of a double diode 88 and the center tap 89 of the secondary winding 82 is connected through a conductor 90 to one terminal of the secondary winding 84, the opposite terminal of which is connected through a conductor 91 to a pair of cathode resistors 92 and 93 which are respectively connected as shown to the upper and lower cathodes 94 and 95 of the double diode 88. Suitable smoothing condensers 96 and 97 are respectively connected across the cathode resistors 92 and 93 for purposes well understood in the art.

Similarly, the outer terminals of the secondary winding 83 are respectively connected to the upper and lower plates 98 and 99 of a second double diode 100 and the center tap 101 of the winding 83 is connected through a conductor 102 to one terminal of the secondary winding 85, the other terminal of which is connected through a conductor 103 to two cathode resistors 104 and 105, which are respectively shunted by smoothing condensers 106 and 107 and are respectively connected to the cathodes 108 and 109 of the double diode 100. As shown, the cathodes 95 and 108, which are respectively connected in circuit with the lower half of the secondary winding 82 and the upper half of the secondary winding 83, are connected to ground at 110, and the cathodes 94 and 109, which are respectively connected in circuit with the upper half of the secondary winding 82 and the lower half of the secondary winding 83 are connected to suitable output terminals 111 and 112. With the double diode rectifiers 88 and 100 connected as shown, direct current output voltages are obtained at the terminals 111 and 112 of equal magnitude and opposite polarity with respect to ground. These voltages are proportional in amplitude to the phase difference between the two signals applied at the terminals 44 and 66 and of polarities dependent upon the sense of the phase difference between the same two signals. In other words, if one of the signals applied to the terminals 44 and 66 changes from leading to lagging phase relationship with respect to the other signal, the direct current voltages at the output terminals 111 and 112 will reverse in polarity.

More specifically, analysis of the connections of the transformers 76 and 81, the double diode rectifiers 88 and 100, and the cathode resistors 92, 93, 104 and 105 with respect to the ground connection 110 and the output terminals 111 and 112, will show that when the signals applied at the terminals 44 and 66 are in phase with each other a maximum direct current output voltage of predetermined polarity will be developed at the terminal 111, and when the input signals are 180° out of phase a maximum direct current voltage of opposite polarity wil be developed at the terminal 111, the direct current voltage passing through zero and reversing polarity when the input signals are 90° out of phase. The same effect is produced at the terminal 112 except that the voltages at the terminals 111 and 112 are at all times of opposite polarity with respect to ground.

Connected to the output terminals 111 and 112 is an anti-hunt network comprising a pair of resistors 113 and 114 which are connected to ground at 115 and which are connected to the terminals 111 and 112 respectively through condensers 116 and 117, the condensers being respectively shunted by resistors 118 and 119. The anti-hunt network functions by reason of the relative magnitudes of the condensers 116 and 117 and the resistors 113 and 114 to introduce into the signal voltages appearing at the terminals 111 and 112 a voltage component which is proportional to the rate of change of the signal voltages, thus producing an anticipating effect, whereby upon a sudden change in the applied signal voltages, the voltages at the output terminals 120 and 121 of the anti-hunt network may fall to zero or even reverse in polarity a predetermined interval ahead of the applied signal voltage. This arrangement prevents hunting of the D. C. motor 45 which, as previously indicated, is energized by a direct current voltage derived from the signal voltages produced at the output terminals 111 and 112 of the phase discriminator circuit. For a description of the theoretical operation of anti-hunt networks of this type, reference may be had to pages 15 and 28 of the Radio-Electronic-Engineering edition of Radio News for August 1948.

The output terminals 120 and 121 of the anti-hunt network are connected as shown to the upper and lower contacts 122 and 123 of a synchronous vibrator 124 having a pair of reeds 125 and 126 adapted to be driven by an operating magnet 127, the primary winding of which is connected in an energizing circuit comprising a battery 128, a choke coil 129, a contact 130, and the vibrator reed 126, the battery and the reed being connected to ground at 132 and 131 respectively. A suitable condenser 133 is connected across the operating magnet 127 and the make and break gap between the contact 130 and the reed 126, for purposes well understood in the art.

The reed 125 of the vibrator 124, which is arranged alternately to engage the contacts 122 and 123 is connected by way of a conductor 134 and a series coupling condenser 135 to the input electrode or control grid 136 of an amplifier tube 137 which is of the well known pentode type having a cathode 138, a screen grid 139, a suppressor grid 140 and a plate or anode 141. It will thus be apparent that as the reed 125 of the vibrator 124 alternately engages the vibrator contacts 122 and 123, a signal will be applied to the control grid 136 of the amplifier tube 137 which will be substantially a square wave signal whose frequency corresponds to the frequency of the vibrator, whose amplitude corresponds to the amplitude of the signals at the output terminals 120 and 121 of the anti-hunt network, and whose phase depends upon the relative polarities of the same two signals. Thus, the phase of the square wave signal applied to the amplifier tube 137 depends upon the sense of the phase displacement between the signals applied to the input terminals 44 and 66 of the discriminator.

The output of the amplifier tube 137 is applied as shown to a conventional phase inverter 142 which is in turn connected to supply a pair of power amplifier tubes 143 and 144 connected for push-pull operation and having their respective anodes connected to the opposite ends of a center tapped primary winding 144a of a coupling transformer 145, the secondary winding 146 of which is connected for full wave rectification to the rectifier contacts 147 and 148 of the synchronous vibrator 124 through conductors 149 and 150. The center tap 151 of the secondary winding 146 is connected by way of a conductor 152, a radio frequency choke 153, a conductor 154, a center contact 155 of a multiple position switch 156, the purpose of which will be explained hereinafter, and the movable contact 157 of the switch 156 and a conductor 158 to the input terminal 49 of the indicator 30. Since the vibrator reed 126 operates in synchronism with the vibrator reed 125, which latter reed produces the square wave voltage applied to the amplifier tube 137, full wave rectification of the amplified signal developed across the winding 146 is obtained. During alternate half cycles of this voltage, the energizing circuit for the motor 45 may be traced from the ground connection 131, the reed 126, the vibrator contact 148, for example, the conductor 150, and the upper half of the secondary winding 146 to the input terminal 49 and by way of the previously described circuit and the conductor 48 and the motor winding back to ground at the connection 159. During intervening half cycles of the signal voltage developed across the winding 146, the motor energizing circuit includes the reed 126, the vibrator contact 147, the conductor 149, the lower half of the winding 146, the conductor 152, the choke coil 153, the contact 155 and switch blade 157, and the conductors 158 and 48. While the vibrator 124 may be driven at any desired frequency, it is preferably operated at a frequency far removed from the frequency of the input signal voltages and may, for example, be driven at frequencies in the neighborhood of 60 to 90 cycles per second.

As will be apparent from the foregoing description of the phase discriminator and motor drive network, the motor 45 and the indicator member or pointer 46 of the indicator 30 will remain at rest whenever the phase relationship between the two signals applied to the input terminals 44 and 66 of the phase discriminator 28 is such that zero voltage is developed by the phase discriminator and the motor drive network. This condition prevails only when the signal voltages respectively applied to the discriminator network input terminals 44 and 66 are displaced in phase by ninety degrees. However, when the phase of the position indicating heterodyne signal applied to the input terminal 44 shifts due to movement of the mobile receiving unit 13, the phase discriminator and motor drive network develop a direct current voltage of the proper polarity to cause the motor 45 to rotate in a direction to adjust the rotor of the control transformer 47 and thereby vary the phase of the signal voltage applied to the input terminal 66 so as again to establish a ninety degree phase relationship between the two input signals, thereby to reduce to zero the output voltage of the network 28, whereupon the motor 45 and the pointer 46 again come to rest in a position accurately indicating the position of the mobile receiving unit 13 relative to the transmitting unit 10 and the transmitter 21.

At the start of a position determining operation, it is necessary to initially set the revolution counter 53. This may be accomplished by means of the multi-position switch 156 which, in addition to the fixed contact 155 and the movable contact 157, includes spaced stationary contacts 164 and 165 adapted to be engaged by the movable contact 157 and connected to direct current sources of opposite polarity, such, for example, as the batteries 166 and 167, whereby the motor may be selectively energized through the movable contact 157 for operation in either direction to set the revolution counter 53 in any desired initial position corresponding to the lane position of the mobile receiving unit 13 at the start of a survey operation. At the start of a survey operation it is also necessary to set the pointer 46 of the indicator 30 in the position corresponding to the known starting point of the mobile receiving unit 13 and this may be accomplished by means of a manually operable control knob 160 carried on a rotatable shaft 161 which is effective through a pinion 162 and a rack gear 163 to rotate the stator of the control transformer 47, thereby to change the angular position of the stator windings 59 and 60 relative to the rotor winding 58. This has the effect of changing the phase relationship between the signal input voltages impressed upon the discriminator network input terminals 44 and 66 and hence of producing operation of the motor 45 to drive the pointer 46 and rotor 57 in a manner clearly apparent from the above explanation.

In order to obtain the desired degree of accuracy in the position indications provided by the indicator 30, it is imperative that each one degree of rotation of the pointer 46 must, through rotation of the rotor winding 58 of the control transformer 47, produce a one degree phase shift in the output voltage of the rotor winding. The previously referred to coupling unit 55 is connected between the motor 45 and the rotor of the control transformer in order to accomplish this end in the manner more fully explained below.

As shown in Figs. 4 to 10, inclusive, in which the previously identified parts of the indicator 30 are indicated by the same reference numerals, and as shown diagrammatically in Fig. 3, the worm gear 51, which is driven through the worm 50 by the motor 45, is provided with a slot or aperture 168 for receiving a pin 169 carried by a driving member 170 forming a part of the coupling unit 55. The driving member 170, which may be in the form of a disk or a segment of a disk, is mounted for free rotation on a stub shaft 171 (Fig. 10), to which is secured a collar 172 having an extending arm 173. A resilient driving connection between the driving member 170 and the collar 172 is provided by means of a spring 174 which, as shown best in Fig. 9, has one end thereof connected to the member 170 and the other end connected to the arm 173. The collar 172, as shown best in Fig. 10, is rigidly connected to the shaft 56 on which the rotor 57 bearing the rotor winding 58 of the control transformer 47 is carried. Pivotally connected to the outer end of the arm 173 is a link or lever 175 which is connected intermediate its ends to a second link 176 mounted on a pivot pin 177 carried by the driving member 170 and the link 175 carries at its outer end a roller 178 adapted to engage a continuous substantially circular, or so-called garter, spring 179. The spring 179, as shown best in Figs. 7 and 10, is supported throughout its periphery on a plurality of supporting fingers 180 carried on radially adjustable posts 181, which threadedly engage a circumferentially extending supporting flange 182.

When the driving member or disk 170 is rotated by the worm gear 51, rotation of the rotor 57 will be effected either through the tendency of the rotation to tighten the spring 174 or through relaxation of the tension on the spring 174. At the same time, however, the lever 175 and the roller 178 will be moved and in order to effect unequal increments of movement of the rotor 57 relative to incremental movement of the motor 45 and the gear 51, the peripheral configuration of the garter spring 179 may be varied through adjustment of the supporting posts 181 so that the roller 178 and the link 175 will offer increased or decreased resistance to movement, as desired, thereby causing the tightening or relaxation of the driving spring 174. By proper adjustment of the garter spring 179, the rotor 57 of the control transformer 47 may be caused to move a distance greater or less than the movement of the pointer 46, as may be required to insure a one degree phase shift in the output of the rotor winding 58 for each one degree of movement of the pointer 46.

Preferably and in order to assist in the initial calibration of the coupling unit 55, the annular supporting member 182, which carries the adjustable posts 181, is provided with suitable indicia 183 for cooperation with a pointer 184 carried on the stub shaft 171 of the coupling member 172, and additional indicia 185 carried by the driving member 170 are provided for effecting adjustment at one degree intervals.

As previously indicated the phase discriminator 29 and the indicator 31, in which previously identified corresponding connections and components are indicated by the same reference numerals, are identical with the corresponding units 28 and 30 except that they are energized, during alternate intervals in which the transmitter 20 is operating, by the 0.250 kilocycle position indicating heterodyne signal from the receiver 27 and by the 0.250 kilocycle reference signal from the receiver 26 so as to produce a continuous indication of the position of the mobile receiving unit relative to the transmitting units 11 and 12. Consequently the two indicators 30 and 31 are effective to produce a continuous, accurate and unambiguous indication of the position of the mobile receiving unit at any point within the area blanketed by the transmitting units 10, 11 and 12.

It will be observed that the units 28, 29, 30 and 31 are connected to the receiver 26 and 27 only by the cables or conductors 39 and 41 and consequently the phase discriminating and position indicating apparatus may be conveniently located, as desired, on the vehicle or vessel carrying the receiving unit 13, either closely adjacent to or remote from the receiving unit.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed and desired to be secured by Letters Patent is:

1. Wave signal receiving apparatus for translating received space radiated waves into position indications, comprising wave signal receiving means responsive to different received waves to develop two signals having a phase relationship representative of the position of said receiving apparatus relative to the sources of said waves, follow-up type indicator means including a driving motor, variable phase transformer means energizable by one of said signals and including a rotor winding driven by said motor to produce a variable phase signal having a phase relationship to the other of said signals which is a function of the phase relationship between said two signals and of the position of said rotor winding, and phase discriminator means excited by said other of said two signals and by said variable phase signal for energizing said motor with a voltage having a magnitude related to the phase difference between said exciting signals and having a polarity indicative of the sense of the phase difference between said exciting signals.

2. Wave signal receiving apparatus for translating received space radiated waves into position indications, comprising wave signal receiving means responsive to different received waves to develop two signals having a phase relationship representative of the position of said receiving apparatus relative to the sources of said waves, follow-up type indicator means including a driving motor, variable phase transformer means energizable by one of said signals and including a rotor winding driven by said motor to produce a variable phase signal having a phase relationship to the other of said signals which is a function of the phase relationship between said two signals and of the position of said rotor winding, and phase discriminator means excited by said other of said two signals and by said variable phase signal for producing a direct current output voltage related in magnitude to the phase difference between said exciting signals and having a polarity indicative of the sense of the phase difference therebetween, said output voltage being zero when said variable phase signal and said other signal have a predetermined phase relationship therebetween, and means for energizing said motor in accordance with said output voltage to drive said indicating means and said rotor winding to a position representative of said predetermined phase relation.

3. Wave signal receiving apparatus for translating received space radiated waves into position indications, comprising wave signal receiving means responsive to different received waves to develop two signals having a phase relationship representative of the position of said receiving apparatus relative to the sources of said waves, phase indicator means including an indicator member, motor means for driving said indicator member, variable phase transformer means having a stator and having a rotor driven by said motor means, stator and rotor windings for said transformer means, means for impressing one of said signals on said stator winding to produce in said rotor winding a variable phase signal having a phase relationship to the other of said signals which is a function of the phase relationship between said two signals and of the rotary position of said rotor winding, phase discriminator means energizable jointly by said other of said two signals and said variable phase signal for producing a direct current output voltage related in magnitude to the phase difference between said variable phase signal and said other signal and having a polarity indicative of the sense of the phase difference therebetween, said output voltage being zero when said variable phase signal and said other signal have a predetermined phase relationship therebetween, and means for energizing said motor means in accordance with said output voltage to move said indicator member and to establish said predetermined phase relationship between said other signal and said variable phase signal.

4. Wave signal receiving apparatus for translating received space radiated waves into position indications, comprising wave signal receiving means responsive to different received waves to develop two signals having a phase relationship representative of the position of said receiving apparatus relative to the sources of said waves, phase indicator means including an indicator member, motor means for driving said indicator member, variable phase transformer means having a stator and having a rotor driven by said motor means, stator and rotor windings for said transformer means, means for impressing one of said signals on said stator winding to produce in said rotor winding a variable phase signal having a phase relationship to the other of said signals which is a function of the phase relationship between said two signals and of the rotary position of said rotor winding, phase discriminator means energizable jointly by the other of said two signals and said variable phase signal for producing a direct current output voltage related in magnitude to the phase difference between said variable phase signal and said other signal and having a polarity indicative of the sense of the phase difference therebetween, said output voltage being zero when said variable phase signal and said other signal have a predetermined phase relationship therebetween, means for energizing said motor means in accordance with said output voltage to move said indicator member and to establish said predetermined phase relationship between said other signal and said variable phase signal, said indicator member being rotatable through more than 360° to indicate the phase relationship between said two signals, and means for indicating the number of complete revolutions made by said indicator means.

5. Wave signal receiving apparatus for translating received space radiated waves into position indications, comprising a first receiver for receiving a pair of space radiated waves and for heterodyning said waves to produce a heterodyne signal having a frequency related to the difference frequency between said waves, a second receiver for receiving and reproducing a reference signal having a frequency representative of the difference frequency between said pair of waves, null type phase indicator means including a driving motor, variable phase transformer means energizable by said reference signal and including a rotor winding driven by said motor to produce a variable phase signal having a frequency representative of said difference frequency and having a phase relationship to said heterodyne signal which is a function of the phase relationship between said reference signal and said heterodyne signal and of the rotary position of said rotor winding, and phase discriminator means excited jointly by said heterodyne signal and said variable phase signal for energizing said motor with a direct current voltage related in magnitude to the phase difference between said exciting signals and having a polarity indicative of the sense of phase difference therebetween.

6. Wave signal receiving apparatus for translating received space radiated waves into position indications, comprising a first receiver for receiving a pair of space radiated waves and for heterodyning said waves to produce a heterodyne signal having a frequency related to the difference frequency between said waves, a second receiver for receiving and reproducing a reference signal having a frequency representative of the difference frequency between said pair of waves, null type phase indicator means including a driving motor, variable phase transformer means energizable by said reference signal and including a rotor winding driven by said motor to produce a variable phase signal having a frequency representative of said difference frequency and having a phase relationship to said heterodyne signal which is a function of the phase relationship between said reference signal and said heterodyne signal and of the rotary position of said rotor winding, phase discriminator means excited jointly by said heterodyne signal and said variable phase signal for energizing said motor with a direct current voltage related in magnitude to the phase difference between said exciting signals, said indicator means being rotatable by said motor through more than 360°, and means for indicating the number of complete revolutions made by said indicator means.

7. Wave signal receiving apparatus for translating received space radiated waves into position indications, comprising a first receiver for receiving a pair of space rediated waves and for heterodyning said waves to produce a heterodyne signal having a frequency related to the difference frequency between said waves, a second receiver for receiving and reproducing a reference signal having a frequency representative of the difference frequency between said pair of waves, null type phase indicator means including a driving motor, variable phase transformer means energizable by said reference signal and including a rotor winding rotatably driven by said motor to produce a variable phase signal having a frequency representative of said difference frequency and having a phase relationship to said heterodyne signal which is a function of the phase relationship between said reference signal and said heterodyne signal and of the rotary position of said rotor winding, phase discriminator means energizable jointly by said heterodyne signal and said variable phase signal for producing a direct current output voltage related in magnitude to the phase difference between said variable phase signal and said heterodyne signal and having a polarity indicative of the sense of the phase difference therebetween, said output voltage being zero when said variable phase signal and said heterodyne signal have a predetermined phase relationship therebetween, and means for energizing said motor in accordance with said output voltage to move said indicator member and to move said rotor winding to a position wherein said predetermined phase relationship is established between said heterodyne signal and said variable phase signal.

8. Wave signal receiving apparatus for translating received space radiated waves into position indications, comprising a first receiver for receiving a pair of space radiated waves and for heterodyning said waves to produce a heterodyne signal having a frequency related to the difference frequency between said waves, a second receiver for receiving and reproducing a reference signal having a frequency representative of the difference frequency between said pair of waves, phase indicator means including an indicator member, motor means for driving said indicator member, variable phase transformer means having a stator and having a rotor driven by said motor means, stator and rotor windings for said transformer means, means for impressing said reference signal on said stator winding to produce in said rotor winding a variable phase signal having a frequency representative of said difference frequency and having a phase relationship to said heterodyne signal which is a function of the phase relationship between said reference signal and said heterodyne signal and of the rotary position of said rotor winding, phase discriminator means energizable jointly by said heterodyne signal and said variable phase signal for producing a direct current output voltage related in magnitude to the phase difference between said variable phase signal and said heterodyne signal and having a polarity indicative of the sense of the phase difference therebetween, said output voltage being zero when said variable phase signal and said heterodyne signal have a predetermined phase relationship therebetween, and means for energizing said motor means in accordance with said output voltage to move said indicator member and to establish said predetermined phase relationship between said heterodyne signal and said variable phase signal.

9. Wave signal receiving apparatus for translating received space radiated waves into position indications, comprising a receiver operating to receive a first pair of space radiated waves and to heterodyne said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver operative to receive and heterodyne said second pair of radiated waves to produce a second heterodyne signal having a frequency equaling the frequency of said first reference signal, said second receiver being alternately operative to receive and reproduce a second reference signal having a frequency representative of the difference frequency between said first pair of waves and modulated upon one of said second pair of waves, phase measuring and indicating means excited by said signals in pairs and including a pair of indicators rotatable through more than 360° to indicate the phase relationship between said first heterodyne and second reference signals and between said second heterodyne and first reference signals to provide two indications of the position of said receiving apparatus relative to two displaced sources of said waves, and means for indicating the number of complete revolutions made by each of said indicators.

10. Wave signal receiving apparatus for translating received space radiated waves into position indications, comprising a receiver operating to receive a first pair of space radiated waves and to heterodyne said waves to produce a first heterodyne signal having a frequency related to the difference frequency between said waves, said receiver being alternately operative to receive and reproduce a first reference signal having a frequency representative of the difference frequency between a second pair of radiated waves and modulated upon one of said first pair of radiated waves, a second receiver operative to receive and heterodyne said second pair of radiated waves to produce a second heterodyne signal having a frequency equaling the frequency of said first reference signal, said second receiver being alternately operative to receive and reproduce a second refrence signal having a frequency representative of the difference frequency between said first pair of waves and modulated upon one of said second pair of waves, phase measuring and indicating means excited by said signals in pairs and including a pair of indicators rotatable through more than 360° to indicate the phase relationship between said first heterodyne and second reference signals and between said second heterodyne and first reference signals to provide two indications of the position of said receiving apparatus relative to two displaced sources of said waves, counter means for indicating the number of complete revolutions made by each of said indicators, and means for adjusting said indicators and said counter means to settings corresponding to a known starting position of said apparatus relative to said sources.

11. Wave signal receiving apparatus for translating received space radiated waves into position indications, comprising wave signal receiving means responsive to different received waves to develop two signals having a phase relationship representative of the position of said receiving apparatus relative to the sources of said waves, null type indicator means including an indicating element and a motor for driving said element, variable phase transformer means including a stator winding energizable by one of said signals, a rotor winding for producing a variable phase signal, adjustable means coupling said motor to said rotor winding for variably driving said rotor winding to effect a shift of one electrical degree in the phase of said variable phase signal for each degree of rotation of said indicating element and phase discriminator means excited by the other of said two signals and by said variable phase signal for energizing said motor with a voltage having a magnitude related to the phase difference between said exciting signals and having a polarity indicative of the sense of the phase difference therebetween.

12. Wave signal receiving apparatus for translating received space radiated waves into position indications, comprising wave signal receiving means responsive to different received waves to develop two signals having a phase relationship representative of the difference between the distances of said receiving apparatus from the sources of said waves, null type indicator means including an indicating element and a motor for driving said element, variable phase transformer means including a stator winding energizable by one of said signals, a rotor winding for producing a variable phase signal, adjustable means coupling said motor to said rotor winding for variably driving said rotor winding to effect a shift of one electrical degree in the phase of said variable phase signal for each degree of rotation of said indicating element, and phase discriminator means excited by the other of said two signals and by said variable phase signal for producing a direct current output voltage related in magnitude to the phase difference between said exciting signals and having a polarity indicative of the sense of the phase displacement therebetween, said output voltage being zero when said variable phase signal and said other signal have a predetermined phase relationship therebetween, and means for energizing said motor in accordance with said output voltage to drive said indicating element and said rotor winding to a position wherein said predetermined phase relationship is established between said variable phase signal and said other signal.

13. Wave signal receiving apparatus for translating received space radiated waves into position indications, comprising a first receiver for receiving a pair of space radiated waves and for heterodyning said waves to produce a heterodyne signal having a frequency related to the difference frequency between said waves, a second receiver for receiving and reproducing a reference signal having a frequency representative of the difference frequency between said pair of waves, null type phase indicator means including an indicating element and a motor for driving said element, variable phase transformer means including a stator winding energizable by said reference signal, a rotor winding movable with respect to said stator winding for producing a variable phase signal, adjustable means coupling said motor means to said rotor winding for variably driving said rotor winding to produce a shift of one electrical degree in said variable phase signal for each degree of rotation of said indicating element, phase discriminator means energizable jointly by said heterodyne signal and said variable phase signal for producing a direct current output voltage related in magnitude to the phase difference between said variable phase signal and said heterodyne signal and having a polarity indicative of the sense of the phase difference therebetween, said output voltage being zero when said variable phase signal and said heterodyne signal have a predetermined phase relationship therebetween, and means for energizing said motor in accordance with said output voltage to move said indicator member and to adjust said rotor winding to a position wherein said predetermined phase relationship is established between said heterodyne signal and said variable phase signal.

14. Apparatus for indicating the phase relationship between two signals of the same frequency which may have a phase relationship variable between zero and three hundred and sixty electrical degrees, comprising indicator means and a motor for driving said indicator means, variable phase transformer means having a rotor driven by said motor, stator and rotor windings for said transformer means, means for impressing one of said signals on said stator winding to induce in said rotor winding a variable phase signal having the same frequency as said one signal and having a phase relationship to said one signal which is a function of the rotary position of said rotor winding relative to said stator winding, phase discriminator means energizable jointly by the other of said signals and said variable phase signal for producing a direct current output voltage related in magnitude to the phase difference between said variable phase signal and said other signal and having a polarity indicative of the sense of the phase difference therebetween, said output voltage being zero when said variable phase signal and said other signal have a predetermined phase relationship therebetween, and means for energizing said motor in accordance with said output voltage to drive said indicator means and simultaneously to rotate said rotor winding relative to said stator winding to establish said predetermined phase relationship between said variable phase signal and said other signal.

15. Apparatus for indicating the phase relationship between two signals of the same frequency which may have a phase relationship variable between zero and three hundred and sixty electrical degrees, comprising indicator means and a motor for driving said indicator means, variable phase transformer means including a stator and a rotor, stator and rotor windings for said transformer means, means for impressing one of said signals on said stator winding to induce in said rotor winding a variable phase signal having the same frequency as said one signal and having a phase relationship to said one signal which is a function of the angular position of said rotor winding relative to said stator winding, adjustable means coupling said motor means to said rotor for variably rotating said rotor winding to produce a shift of one electrical degree in said variable phase signal for each degree of movement of said indicator means, phase discriminator means energizable jointly by the other of said signals and said variable phase signal for producing a direct current output voltage related in magnitude to the phase difference between said variable phase signal and said other signal and having a polarity indicative of the sense of the phase difference therebetween, said output voltage being zero when said variable phase signal and said other signal have a predetermined phase relationship therebetween, and means for energizing said motor in accordance with said output voltage to drive said indicator means and simultaneously to rotate said rotor winding relative to said stator winding to establish said predetermined phase relationship between said variable phase signal and said other signal.

JAMES E. HAWKINS.
BEVERLY W. KOEPPEL.

REFERENCES CITED

The following references are of record in the file of this patent:

UNITED STATES PATENTS

| Number | Name | Date |
|---|---|---|
| 1,562,485 | Affel | Nov. 24, 1925 |
| 2,256,482 | Isbister et al. | Sept. 23, 1941 |
| 2,408,773 | Goodall | Oct. 8, 1946 |
| 2,500,200 | O'Brien | Mar. 14, 1950 |

FOREIGN PATENTS

| Number | Country | Date |
|---|---|---|
| 546,482 | Germany | Sept. 23, 1941 |